(12) United States Patent
Pouyllau

(10) Patent No.: US 11,120,354 B2
(45) Date of Patent: Sep. 14, 2021

(54) SYSTEM AND METHOD FOR AIDING DECISION

(71) Applicant: THALES, Courbevoie (FR)

(72) Inventor: Hélia Pouyllau, Palaiseau (FR)

(73) Assignee: THALES, Courbevoie (FR)

( * ) Notice: Subject to any disclaimer, the term of this patent is extended or adjusted under 35 U.S.C. 154(b) by 711 days.

(21) Appl. No.: 15/778,600

(22) PCT Filed: Nov. 24, 2016

(86) PCT No.: PCT/EP2016/078634
§ 371 (c)(1),
(2) Date: May 23, 2018

(87) PCT Pub. No.: WO2017/089443
PCT Pub. Date: Jun. 1, 2017

(65) Prior Publication Data
US 2018/0349783 A1 Dec. 6, 2018

(30) Foreign Application Priority Data

Nov. 27, 2015 (FR) ..................................... 1502483

(51) Int. Cl.
*G06N 20/00* (2019.01)
*G06N 7/00* (2006.01)
(Continued)

(52) U.S. Cl.
CPC ............. *G06N 7/005* (2013.01); *G06F 17/16* (2013.01); *G06F 17/18* (2013.01); *G06N 7/06* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2003/0149675 A1* | 8/2003 | Ansari | H04N 21/4751 706/2 |
| 2015/0100530 A1* | 4/2015 | Mnih | G06N 20/00 706/25 |
| 2016/0321542 A1* | 11/2016 | Towal | G06N 7/005 |

FOREIGN PATENT DOCUMENTS

| | | |
|---|---|---|
| EP | 2 249 292 A1 | 11/2010 |
| WO | 2013/059517 A1 | 4/2013 |

OTHER PUBLICATIONS

Song, "Research on Opponent Models in Texas Poker", Chinese Excellent Master's Thesis Full-text Database Science and Technology Information Series, pp. 1140-1142, Feb. 15, 2015.

(Continued)

*Primary Examiner* — David R Vincent
(74) *Attorney, Agent, or Firm* — BakerHostetler

(57) ABSTRACT

A decision aid method for determining an action to be implemented by a given competitive entity in a competitive system comprises the competitive entity and at least one other adverse competitive entity, the competitive entity being able to implement an action from among a set of predefined actions, each action providing a different expected gain as a function of the actions implemented by the adverse competitive entities. Each entity is furthermore able to implement a learning procedure from among a set of predefined learning procedures to learn the actions of the adverse entities, associating with each learning procedure an elementary probability function assigning a probability parameter to each possible action of the given competitive entity; determining a global probability function assigning a probability parameter to each elementary probability function; selecting one of the elementary probability functions by using the global probability function; and applying the selected elementary probability function to determine an (Continued)

action from among the actions implementable by the given competitive entity.

22 Claims, 8 Drawing Sheets

(51) Int. Cl.
*G06N 7/06* (2006.01)
*G06F 17/16* (2006.01)
*G06F 17/18* (2006.01)

(56) References Cited

OTHER PUBLICATIONS

English translation of Notification of First Office Action issued in Chinese Patent Application No. 2021042302160770 dated Apr. 27, 2021.

\* cited by examiner

|  | Block | | Do not block | |
|---|---|---|---|---|
| Dispatch | -1 | 0.7 | 1 | 0.3 |
| Do not dispatch | 0 | 0.3 | 0 | 0 |
FIGURE 8
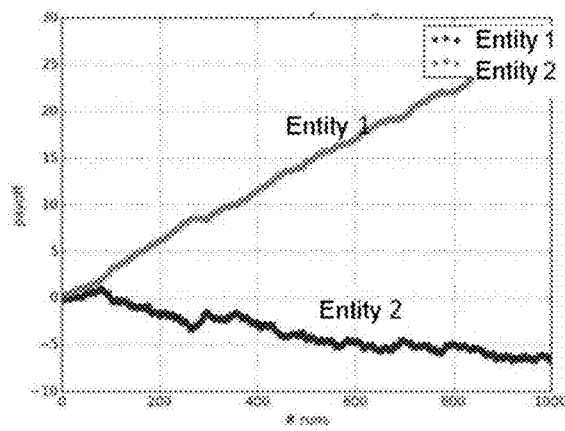
FIGURE 9
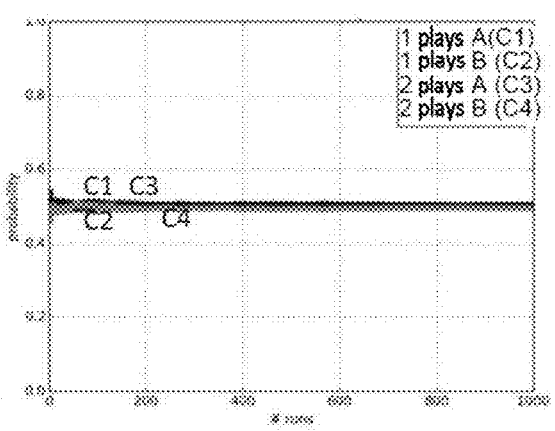
FIGURE 10

|  | Brown | | meta | | EQ 5 | |
|---|---|---|---|---|---|---|
| Brown | -1.06 | 3.058 | -6.3 | 6.566 | 0.96 | 0.768 |
| meta | -8.76 | 0.886 | -18.1 | 8.716 | -11.08 | 1.026 |
| EQ 5 | -9.22 | 1.408 | -18.04 | 7.556 | -11.48 | 2.254 |

|  | Meta | | Option 1 – EQ4 | | Option 2 | |
|---|---|---|---|---|---|---|
| meta | -6.3 | 6.566 | -9.96 | -0.716 | -7.96 | -0.134 |
| Option 1 – EQ4 | -20.06 | 5.514 | -13.4 | 0.68 | -10.34 | -2.778 |
| Option 2 | -20.74 | 6.33 | -13.46 | 1.486 | -9 | -1.928 |

SYSTEM AND METHOD FOR AIDING DECISION

CROSS-REFERENCE TO RELATED APPLICATIONS

This application is a National Stage of International patent application PCT/EP2016/078634, filed on Nov. 24, 2016, which claims priority to foreign France patent application No. FR 1502483, filed on Nov. 27, 2015, the disclosures of which are incorporated by reference in their entirety.

TECHNICAL FIELD

The present invention relates generally to systems for managing data and in particular to a system and a method for aiding decision.

BACKGROUND

Decision aid systems are used in numerous fields where strategic decisions must be taken such as for example in the military field. In particular, such systems can be useful for optimizing the defense strategy in response to an attack triggered by an attacking device. The attacking device can be controlled by one or more operators via a control interface.

The modeling of the behavior of the attacking device is a key issue in being able to predict its future actions and adapt the defense strategy accordingly. Simple strategic decision models are known which can be applied to provide information on the gain (positive or negative) that a defending device can foresee with regard to the actions of the attacking device. The notion of gain quantifies the advantages that can be obtained by choosing one action rather than another, this advantage depending on the opponent's choice.

A known modeling approach based on game theory has been employed to model the strategic decision within the framework of security problems. A "game" consists of a set of competitive entities (also called "players"), of a set of movements/actions (also called "strategies") available to these competitive entities, and of specifications of the expected gains for each combination of actions.

In a game context, equilibrium states can be defined. This signifies that by defining the safety play, it is necessary to know all the actions and the values of possible gains. The equilibria constitute situations according to which the players (comprising the attacking devices and defending devices in the case of a safety play) have no interest in changing their choices of actions (i.e. their strategies). The theory of John Nash (1957) has demonstrated that there always exist "mixed" equilibria in a game. This theory signifies that for games of any type, there always exists a probability distribution, beyond the strategies of the players, which lead to an equilibrium.

The determination of the equilibria is not always a simple problem and is not always desirable. Indeed, in certain cases, it may be desirable to determine the solution closest to the "social" optimum rather than to the equilibrium.

Most existing approaches use a simple learning procedure to find the equilibrium or a value close to the equilibrium. For example, Brown's fictitious player algorithm requires the knowledge of each of the movements of the adversary device and of the corresponding gains for the system. Consequently, this solution is not applicable in practice to numerous problems either because the adverse strategies are unknown or because their combination is not calculable.

Moreover, in certain scenarios, the strategies of the players may change in the course of time, where the context may modify the perceived gains. To solve these problems, other known approaches are based on the use of learning procedures configured to provide values close to the equilibrium or to the social optimum. However these approaches are specific to a statically chosen learning procedure.

SUMMARY OF THE INVENTION

The invention aims to improve the situation by proposing a decision aid method for determining an action to be implemented by a given competitive entity in a competitive system comprising the competitive entity and at least one other adverse competitive entity, the competitive entity being able to implement an action from among a set of predefined actions, each action providing a different expected gain as a function of the actions implemented by said adverse competitive entities, each entity furthermore being able to implement a learning procedure from among a set of predefined learning procedures to learn the actions of the adverse entities, the method comprising:

associating with each learning procedure an elementary probability function which associates a probability parameter with each possible action of the given competitive entity;

determining a global probability function which associates a probability parameter with each elementary probability function;

selecting one of the elementary probability functions by using the global probability function;

applying the selected elementary probability function to determine an action from among the actions implementable by said given competitive entity.

The method may for example comprise the generation of an action recommendation comprising an identifier of the determined action.

In one embodiment, the method can comprise a prior step consisting in modeling the strategic situation of the given competitive entity in the form of a game model comprising the set of possible actions of the competitive entities and the gain function applying to said actions, the gain function associating an expected gain with each action or combination of actions of the competitive entities.

In particular, the probability parameter can be a weight value.

In certain embodiments, the elementary probability functions can correspond to a component of a probability vector defined as a function of a probability distribution.

Each component of the probability vector can then depend on predefined elementary weights.

The method can in particular comprise a step of calculating the gain function on the basis of learning data.

The gain function can in this case depend on one at least of the following multicriteria models from among a weighted sum, Choquet Integral, a generalized additive utility model, a neural network.

As a variant, the gain function can depend on a probabilistic model.

According to a characteristic of the invention, the method can comprise a step of updating at least one elementary probability function by using an updating function, in response to the receipt of learning data obtained by executing or by simulating the selected elementary probability function and the action actually chosen in the competitive system at least once.

The updating step can comprise the updating of the selected elementary probability function.

The updating step can furthermore comprise the updating of at least one of said other elementary probability functions.

The updating step can also comprise the application of a different updating function for each elementary probability function.

In one embodiment, the updating functions can comprise at least one updating function dependent on the gain obtained.

The updating functions can comprise at least one updating function dependent on elementary weights, each elementary weight being associated with a given action and the elementary weights being dependent on the gains obtained.

In particular, the updating function for a given elementary probability function can comprise an action-wise component, each action-wise component depending on the ratio between the elementary weight associated with the action, at the decision step considered, and the total sum of the elementary weights corresponding to the various components of the elementary probability function at the decision step.

According to another characteristic, the updating step can furthermore comprise the updating of the elementary weights as a function of the loss incurred by using the learning procedure associated with the elementary probability function to be updated, at a given decision step.

The updating step can comprise the updating of the elementary weights by applying a Boltzmann distribution function to the gains obtained.

The updating step can comprise the updating of the elementary weights as a function of a parameter representing the state of the environment, of an exploration rate, and of a reset factor.

The updating functions can comprise at least one updating function dependent on gain parameters received measuring the regret of having chosen the learning procedure associated with the elementary probability function rather than another learning procedure, at a given decision step.

The invention furthermore proposes a computer program product, the computer program comprising code instructions making it possible to perform the steps of the method according to any one of the previous characteristics, when the program is executed on a computer.

The invention also proposes a decision aid system for determining an action to be implemented by a given competitive entity in a competitive system comprising said competitive entity and at least one other adverse competitive entity, the competitive entity being able to implement an action from among a set of predefined actions, each action providing a different expected gain as a function of the actions implemented by said adverse competitive entities, each entity furthermore being able to implement a learning procedure from among a set of predefined learning procedures to learn the actions of the adverse entities, each learning procedure being associated with an elementary probability function associating a probability parameter with each possible action of the given competitive entity. According to one aspect of the invention, the decision aid system comprises a global learning module configured to determine a global probability function able to associate a probability parameter with each elementary probability function, the global learning module furthermore comprising a selection unit configured to select one of said elementary probability functions by using the global probability function, the global learning module being able to apply the selected elementary probability function to determine an action from among said actions implementable by said given competitive entity, for example to generate a recommendation including an identifier of the action.

The invention thus provides a meta-learning procedure which makes it possible to select the most suitable learning procedure in a decision aid system in a strategic decision context. When a command and control unit must take a decision whose advantages or drawbacks depend on the actions of the adverse devices, the decision aid system according to the invention is able to provide optimal recommendations.

The embodiments according to the invention thus make it possible to determine the optimal learning scheme from among a set of predefined learning schemes to determine optimal recommendations such as these.

The proposed embodiments make it possible in particular to learn from among a set of learning procedures the one which provides maximum gains for the system.

It is an advantage of the invention to not require a thorough knowledge of all the possible actions of the competitive entities in the competition system considered. In particular, the procedure and the system according to the invention are able to process the uncertainty in the gains of the adverse entities. They adapt furthermore dynamically to the addition of new actions in the competitive system or of other learning schemes such as the algorithm related to the Markov Decision Process (for example Q-Study, SARSA) which are particularly advantageous for the processing of dynamic games, that is to say of games for which the context too may impact the expected gains.

It is yet another advantage of the invention to provide a decision aid system capable of adapting dynamically to the changes of the rules of the opponent devices.

BRIEF DESCRIPTION OF THE DRAWINGS

Other characteristics and advantages of the invention will become apparent with the aid of the description which follows and of the figures of the appended drawings in which:

FIG. 8 is an exemplary gain matrix corresponding to the same exemplary embodiment as that of FIG. 4;

FIG. 9 is a chart representing the evolution of the gains of two competitive entities over time (average over 50 executions), according to an exemplary embodiment, when the two competitive entities use Brown's algorithm;

FIG. 10 is a chart representing the evolution of the probability value associated with the choice of each action for each entity, in the example of FIG. 9;

DETAILED DESCRIPTION

Figure 1:
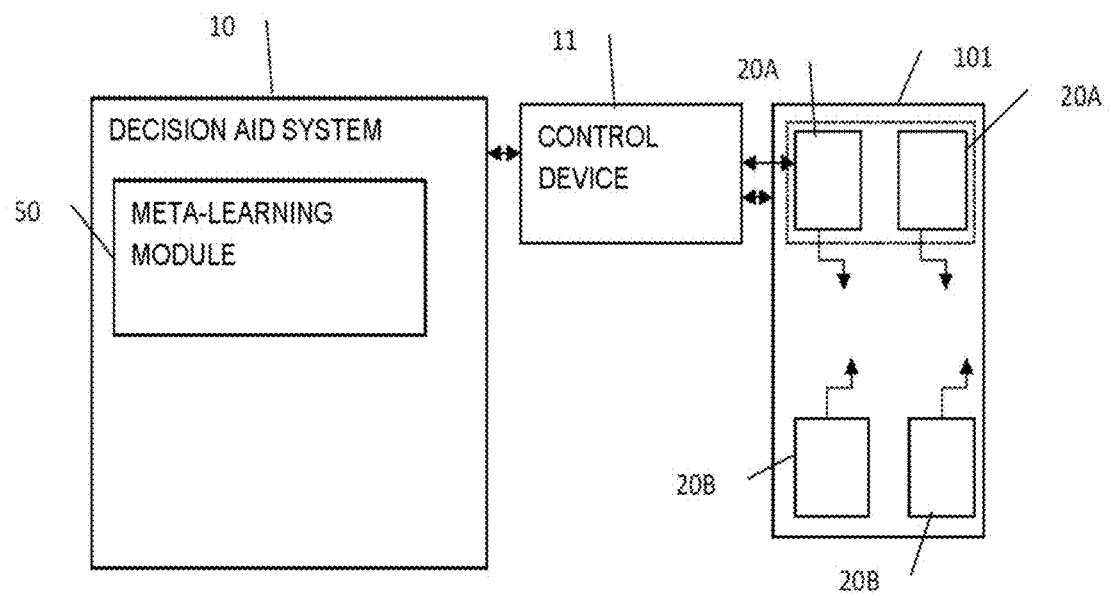
FIG. 1 is a diagram of an exemplary architecture implementing a decision aid system, according to certain embodiments.

FIG. 1 represents in a schematic manner an exemplary architecture implementing a decision aid system 10 according to certain embodiments. The decision aid system 10 interacts with a requesting device 11 (also called control device).

The control device 11 is designed to control one or more competitive entities 20A in a competitive system 101. The decision aid system 10 can receive a request sent by the control device to provide recommendations of actions to be implemented by a given competitive entity 20A of the competitive system (static mode). The decision aid system 10 can also generate recommendations of actions to be implemented by a given competitive entity dynamically, for example in response to a change of the competitive context detected in the competitive system, or periodically.

Such as used here, the expressions "competitive entities" or "competitive agents" designate agents or entities in competition, that is to say having opposed aims, the success of an entity (or agent) being achievable through the defeat of one or more other entities (or agents). Competitive entities can thus comprise attacking entities and opposing entities. An entity can itself be a device or a system.

The competitive entities are associated with a competitive environment or system ("multi-agent" environment or system) that may comprise one or more competitive entities.

The competitive environment can also include independent entities (whose aims are not linked with the competitive entities) and/or collaborative entities.

The control device 11 of each competitive entity may be able to trigger actions in the environment of the controlled competitive entity 20A and collect data of the environment for example by means of sensors. The sensors can be arranged at the level of the competitive entity 20A or in its environment. Each entity may be for example:

a device furnished with sensors (optical sensors, sound sensors, etc.). The control device 11 can control the actions of the device by means of various commands.

A software device that is able to implement actions in its environment for example by dispatching messages via a network, the data of its environment being collected on the basis of the movements of the mouse, of the messages of the network, etc.

The behavior of a competitive entity is described by a strategy which defines one or more actions to be implemented by the entity. It should be noted that the term "action" such as used here refers to a "logical" action, that is to say an action modeled by the system. This action can correspond to one or more "physical" sub-actions. For example, for an action "dispatch a message", several physical sub-actions will be able to be implemented such as "choose the frequency", "establish a connection", "dispatch the message". This strategy of actions can be defined by the decision aid system 10 and implemented by a device of the entity 20A. As a variant, the decision aid system 10 can implement the chosen action instead of sending a recommendation, thus corresponding to an automated decision.

According to one aspect of the invention, the decision aid system 10 comprises a meta-learning module 50 (also called global "learning module" or "global learning device") configured to select a learning algorithm from among a set of predefined learning algorithms and to apply the selected algorithm so as to determine a choice of action to be implemented for a given competitive entity.

A learning algorithm (or learning procedure) in a multi-agent system is configured to determine for a given entity (the one which learns) a strategy which can offer a maximum gain with respect to the adverse entities, by using the experience acquired about the environment of the entity (strategic situation data also called "learning data" hereinafter).

A multi-agent learning algorithm thus attempts to learn a model represented by a gain matrix if the adverse strategies are known, or a vector of gains if the strategies are not known. A gain matrix associated with a competitive system is represented as a tuple $(A_{1\ldots N}, R_{1\ldots N, 1\ldots M})$ where N designates the number of competitive entities, Cn is the set of actions that the entity n can choose and Rn the M×N-dimensional matrix which gives the possible gains for each of the possible combinations of the M possible actions of the N entities.

Such as used here, the expression "gain" of a competitive entity designates the benefit or the loss obtained by this entity subsequent to the application of the actions by the set of entities. It thus designates a quantitative datum which may, however, be derived on the basis of a qualitative analysis of the situation. Moreover, the gains can be measured (they are then termed "observable") or calculated by using several parameters characteristic of the situation and by combining them into a multicriteria function (for example, weighted sum, Choquet integral, generalized additive utility model, etc.) or with other procedures (e.g.: bayesian network, neural network, etc.). Whatever the mode of definition of the gains, it can be determined prior to the use of the method. A gain may thus be positive, negative (gain corresponding to a loss) or zero.

The expression "strategy" for a competitive entity designates choices made by the entity between a set of actions; the strategy can be pure if it is based on a single deterministic choice or "mixed" if it is based on a probabilistic choice between the actions.

The known multi-agent learning procedures may rely on various known models:

Markov decision processes
so-called "one-armed bandit" procedures
reinforced learning procedures
fictitious player procedures
matrix games.

More precisely, a learning procedure learns from the parameters the probabilities of choosing an action in a certain state of the entity and provides a probability distribution about the actions (choices).

A learning procedure is associated with an elementary probability function corresponding to a distribution of elementary probabilities on the actions that may be implemented by a competitive entity. This elementary probability function may take the form of a probability vector, each component of the probability vector corresponding to the probability of choosing an action of the given entity. The known learning algorithms may implement various types of equations or of models. The probability vectors associated with each learning algorithm are therefore different from one type of algorithm to the other.

The stable point to be attained for a learning algorithm is called Nash equilibrium, this point corresponding to the point constituting the best response. The Nash equilibrium represents a collection of strategies comprising a set of probability vectors for each entity N such that the vector $p_n$ is found to be a better response to the vectors of the adverse competitive entities "-n".

The environment of a given competitive entity may be variable. Learning algorithms (also called learning procedures) may be used to allow the entities to adapt to such changes. These algorithms may also allow a competitive entity to adapt to the effects of the other entities on the learning data. The learning data can comprise a set of data observed and/or calculated subsequent to the execution or the simulation of actions in the context of the entities. The observation of the learning data can be carried out by applying actions and by observing the result obtained subsequent to the application of these actions.

In particular, the learning data may comprise data relating to the gains obtained by the competitive entities (learning on the failure/success of the actions).

Multi-agent learning procedures can be characterized by several properties such as a rationality property (the entities seek to maximize their gains according to a certain time scale), a convergence property (a learning algorithm stabilizes as a vector of stationary probabilities), a safety property, or a "non-regret" property. Certain learning algorithms may be based on the assumption that the matrices of gains of all the competitive entities are known and/or that the strategy or the actions of the adverse entities are known.

Figure 2:
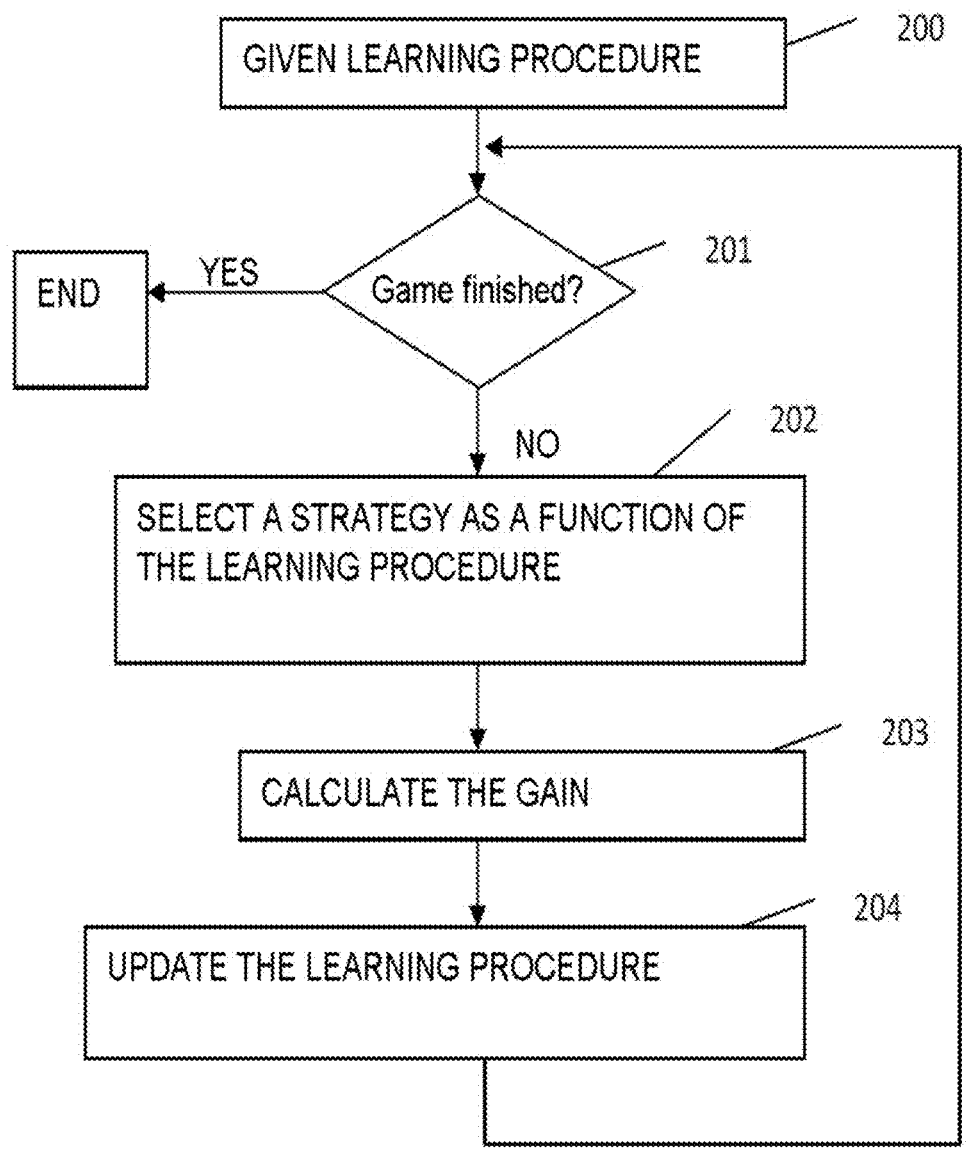
FIG. 2 is a flowchart representing the steps implemented by a learning procedure, according to the prior art during a decision cycle.

A learning procedure may be implemented conventionally according to the steps of the flowchart of FIG. 2, using a single learning method during the whole decision cycle comprising decision steps (or epochs).

For a given learning procedure (block 200), as long as the game has not terminated (condition 201), in step 202, an action is chosen according to the learning procedure.

In step 203, the gain realized by applying the action is calculated.

In step 204, the probability function of the learning procedure is updated using the gain.

To identify the action to be chosen, a learning procedure uses in an equilibrated manner the exploitation information (using the past information) and the exploration data (by testing new strategies or already-used strategies).

The meta-learning module 50 according to the embodiments of the invention is not limited to the use of a single learning algorithm throughout the whole decision cycle but exploits a set of learning algorithms to determine the action to be implemented by a given entity at a given instant.

The meta-learning module 50 is thus configured to select a learning algorithm from among the set of predefined learning algorithms by using the learning data, and thus to improve the decision method and the performance of the entity.

The meta-learning module 50 makes it possible to dynamically modify the parameters of the decision module as a function of the learning data acquired. The learning method comprises a set of cycles of interactions between the agent, its environment, and the adverse entities. During each cycle, the decision aid system 10 can receive learning data (observation phase), analyze these data so as to determine the context and the gain of the previously chosen action and dynamically determines a new choice of action by using its meta-learning module. After the implementation of the action by the competitive entity or at the end of the execution of several actions, new learning data can be collected. New decision cycles can then be implemented by repeating the method.

The decision aid system 10 can return the result to the control device 11 in the form of a recommendation comprising an identifier of the selected action.

The control device 11 may or may not then apply the recommendation as a function of criteria specific to the control device, to the competitive environment and/or to complementary information collected.

In one embodiment, the control device 11 can form an integral part of the competitive entity in a competitive system, for example with a simulatory aim.

In an exemplary embodiment relating to the field of military strategy, the control device 11 can be a combat management system able to control the actions of opposing combat devices (opposing competitive entity) in relation to adverse combat devices (attacking competitive entity) whose actions may hinder the success of the actions of the opposing combat devices.

The decision aid system and procedure thus allow a control device 11 controlling a competitive entity "n" opposed to other adverse entities "-n" to select the action Ci to be chosen (also called "choice") from among a set of actions Cm, i=1, . . . , m by using the learning algorithm k=1, . . . , K such that the action selected by this learning algorithm k provides the maximum gain at a given instant or step t of the decision cycle. The decision aid procedure can be repeated until t attains a predefined threshold Ts or indefinitely. In one embodiment, the decision aid system 10 can itself determine the stopping of the steps of updating the learning procedures by observation of a stabilization (or convergence) of the probabilities of the elementary probability functions and of the meta-learning procedure. For example, if these probabilities do not evolve between two steps t and t+1 beyond a threshold value E.

The gain of an entity n using an action Ci in a decision step t will be denoted hereinafter $u_{n,-n}(i, t)$ or in a simplified notation $u(i, t)$, where i=1, . . . , m is the index of an action of the competitive entity. The gain can be defined by a function or observed directly in the guise of value (for example: the number of fighting units still active). It should be noted that the gain function models the advantage of taking a decision (i.e. of making a choice) with respect to the decisions (or choices) of the adverse entities. In certain embodiments, the gain function may be impacted by a certain uncertainty relating to the characteristics of the environment or to the sensors which are used to collect data on the environment. It then takes a probability distribution into account (theory of stochastic games). In other embodiments, the gain function may also cover several characteristics of the given situation and/or resources of the entity considered (for example: the number of fighting units still active+the terrain won/lost+the cost of the maneuver+etc.), one then speaks of a multicriteria function. Such functions may take the form of a Choquet Integral or of a Generalized Additive Utility model.

Figure 3:
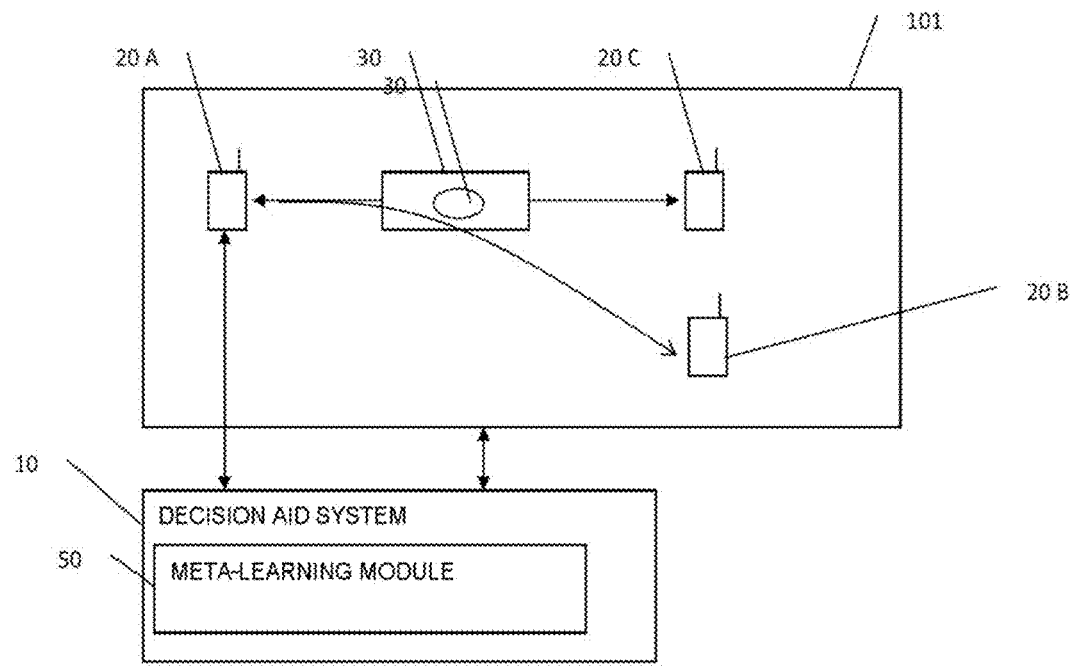
FIG. 3 represents an exemplary competitive system of telecommunication system type including a set of senders and a set of receivers, to which the embodiments of the invention can apply.

The embodiments of the invention may for example be implemented in a competitive system of telecommunication system type including a set of senders 20A and a set of receivers 20B/20C as represented in FIG. 3.

With reference to FIG. 3, such a system comprises one or more senders 20A and one or more receivers 20B/20C interconnected in a communication network that can be formed by competitive entities, a sender 20A being able to constitute an opposing entity and one or more receivers 20B being able to constitute the attacking entities.

In the example of FIG. 3, the competitive system 10 comprises an attacking receiver 20B and an opposing sender 20A.

The sender 20A wishes to dispatch a message on a public transmission channel destined for a target receiver 20C. The message exchanged 30 may be a clear message (i.e. unenciphered) or an encrypted message. The aim of the attacking receiver 20B is to attempt to block the message.

The senders 20A and the receivers 20B and 20C may be for example mobile user equipment such as mobile telephones or smartphones, in a mobile communication network.

In a variant embodiment, the competitive system can include senders 20A and receivers 20B/20C of clients/servers type exchanging http messages in an Internet network according to the Internet protocol, the entity 20B attempting to block the messages sent by the entity 20A destined for a recipient device 20C (computer, smartphone, IT tablet, etc.).

The adverse entities 20B may attempt to hinder the forwarding of the message sent by a sender 20A by means of numerous techniques such as techniques of attack:

by intrusion (exploitation of system vulnerabilities so as to execute unauthorized commands such as the exploitation of configuration errors or bugs);

by physical action (destruction, physical alteration or change of a component of the network);

by identity spoofing (use of a false identity to fool a system or a user);

by code injection (installation and execution of a clandestine module on a system);

by listening (passive and clandestine listening on the network so as to recover information).

Of course, the invention is not limited to this type of competitive system and encompasses any type of competitive system comprising at least two adverse competitive entities. Moreover, the environment itself may be considered to be an adverse competitive entity if it is the only one to impact the system gains. In particular, in a context where there is no adversary but which comprises environmental conditions that cause the gains of the entity to vary, the environment may be the competitive entity itself. For example, in a network, if the entity considered is configured to put routing policies into place, the user traffic may be considered to be the competitive entity, the users constituting an environment whose objective is to maximize its bitrate in the network. Nor is the invention limited to the examples of application cited in the description hereinabove. For example, the decision aid system of the invention can be used in a combat system in which the competitive entities consist of military devices for choosing a firing strategy, command maneuvers, radio frequencies, etc. In another example, the decision aid system of the invention can be used in an energy management system comprising energy production entities and energy consumption entities, the decision aid system 10 being usable by a production entity to decide between an action of energy storage or of energy resale to consumer entities. In yet another example, the decision aid system of the invention can be used in a transports management system in which the entity considered is configured to assign resources (number of coaches or buses, waiting times at lights, etc.) or in a security management system to determine security strategies by simulating intrusions by assailants.

The decision aid procedure and system in the embodiments of the invention make it possible to control the actions of a competitive entity by determining an optimal choice of action for a given entity by selecting a learning algorithm from among a set of predefined learning algorithms at each decision step.

Figure 4:
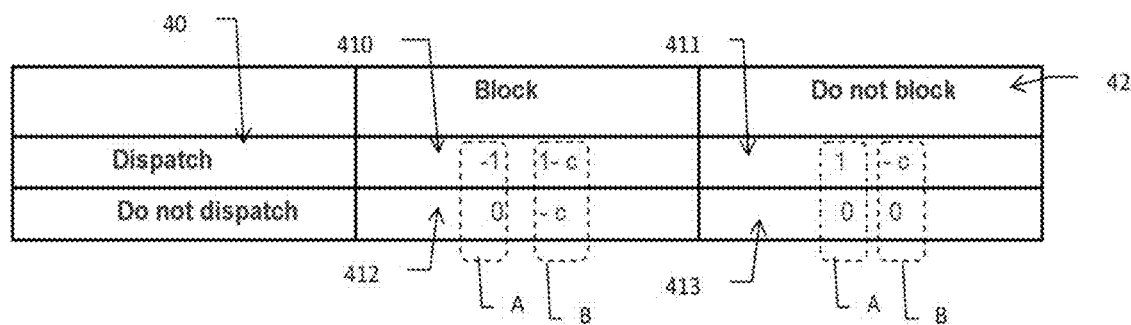
FIG. 4 represents an exemplary gain matrix corresponding to an exemplary competitive system where a competitive entity is threatened by electronic attacks implemented by one or more attacking entities.

FIG. 4 represents a gain matrix (also called table of gains) corresponding to an exemplary competitive system where a competitive entity 20A is threatened by electronic attacks implemented by one or more attacking entities 20B.

In a competitive system such as this, an opposing entity 20A can "win" by dispatching data over an unblocked communication means or "lose" by dispatching the message in a blocked communication means.

The table of FIG. 4 corresponds to an example where a single means of communication (for example of antenna type) is used with the application of a cost c when an attacking entity blocks the communication means. The exemplary table of FIG. 4 corresponds to a single opposing entity.

The opposing entity 20A can choose to dispatch or not dispatch the data by diverse communication means (antennas, satellites).

The opposing entity or entities 21B can choose to block or otherwise one or more of these communication means.

The possible actions of the opposing entity 20A ("dispatch" or "not dispatch" the message) in the competitive environment are indicated in the first column 40 while the possible actions of the attacking entity 20B ("block", "not block" the communication means) in the competitive environment are indicated in the first row 40. In each entry of the matrix 410 to 413, the gain estimated for the opposing entity 20A is indicated in the left-hand part (marked by the reference A), while the gain estimated for the attacking entity 20B is indicated in the right-hand part (marked by the reference B).

In the example of FIG. 4, the Nash Equilibrium is represented by a probability vector $$\left\{\frac{1}{2}, \frac{1}{2}\right\}$$

for each competitive entity.

Although not limited to such applications, the invention exhibits particular interest for aiding decisions in contexts of non-cooperative decisions. Indeed, in such contexts, the gain function takes into account the gains perceived by the so-called "friendly" competitive entities. The control device 11 may then have the capacity to observe data in respect of learning of the "friendly" competitive entities either by sensors, or by a communication module through which the "friendly" competitive entities can dispatch these data.

Figure 5:
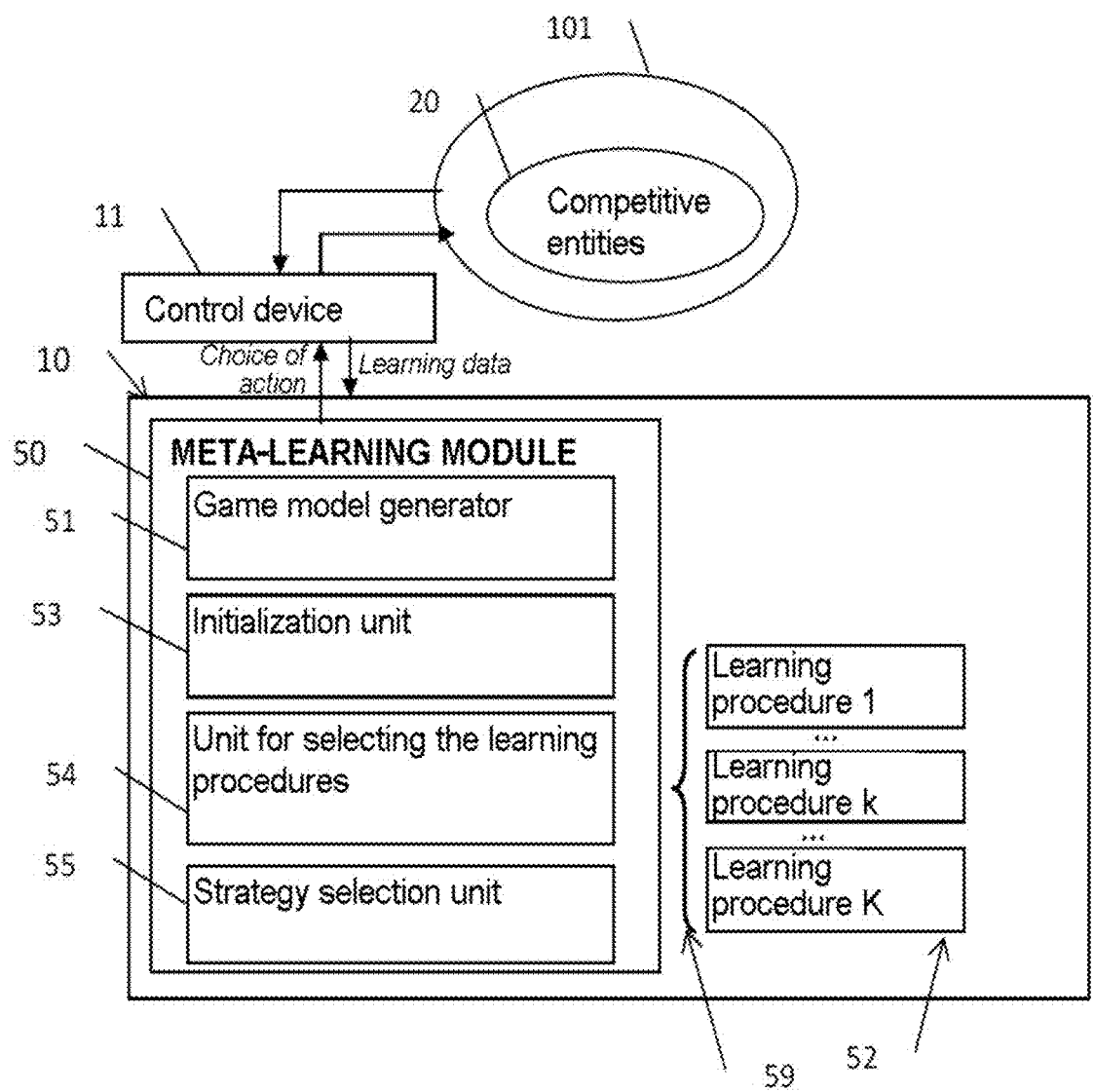
FIG. 5 is a schematic view of the decision aid system comprising a meta-learning device according to certain embodiments.

FIG. 5 is a schematic view of the decision aid system 10 comprising a meta-learning module according to certain embodiments.

The decision aid system 10 is configured to determine a choice of action to be implemented by a competitive entity, for example an opposing entity 20A, in a competitive environment, by using a set of predefined learning procedures. Accordingly, the meta-learning module 50 determines and uses a meta-learning function to select a learning procedure from among the predefined learning procedures 52 and uses the learning procedure selected to determine an action to be implemented by the competitive entity (i.e. strategy). The decision aid system 10 comprises the meta-learning module 50 (also called the global learning module) to select a learning procedure by learning, from among the set of K learning procedures 52.

The meta-learning module 50 can furthermore comprise:

A game model generator 51 configured to generate a game model (also called a "strategic situation") as a function of the context of use considered. In particular, the model comprises a set of possible actions of the entity which uses the system 10 and the gain function applying to the actions. The gains may be observed or observed and calculated. The gain function makes it possible to calculate the gains which are unknown a priori (with respect to the given situation, that is to say the actions of the competitive entity considered, those of the adversary entities, or of other information about the state). The gain function may or may not be modeled and is an input of the decision aid system 10. The model thus generated may be used without the updating phase, to receive or determine the learning data.

An initialization unit 53 for initializing the learning procedures of the predefined set 52; and A learning procedure selection unit 54 for determining a meta-learning function (also called a "global" learning function) and selecting a learning procedure from among the K learning procedures 52 by using the meta-learning function;

An action determination unit 55 for determining a choice of action to be implemented by a given competitive entity on the basis of the learning procedure selected.

Such as used here, the terms "context" or "situation" designate the application environment in which the decision aid system 10 is used and on which the control device 11 depends. The context may be for example a military context using a control device 11 implementing situation awareness. The application context may be a telecom context using a control device 11 of monitoring device type. A device associated with the context which may be the control device 11 itself or a distinct device is configured to collect the learning data (or the latter is requested otherwise) once the action is chosen is executed and to provide them to the decision aid system 10.

The decision aid procedure and system according to certain embodiments of the invention can be implemented either:

in a decision phase to determine an action (also called hereinafter "strategy" or "choice" or "strategic action") to be implemented by a competitive entity 20A so as to obtain an optimal gain with respect to the adverse entities 20B;

in an updating phase to update at least one of the learning procedures and the meta-learning function on the basis of the learning data determined on the basis of the gain parameters 56 obtained or estimated by simulation or execution of action in the context of the competitive entities.

Figure 6:
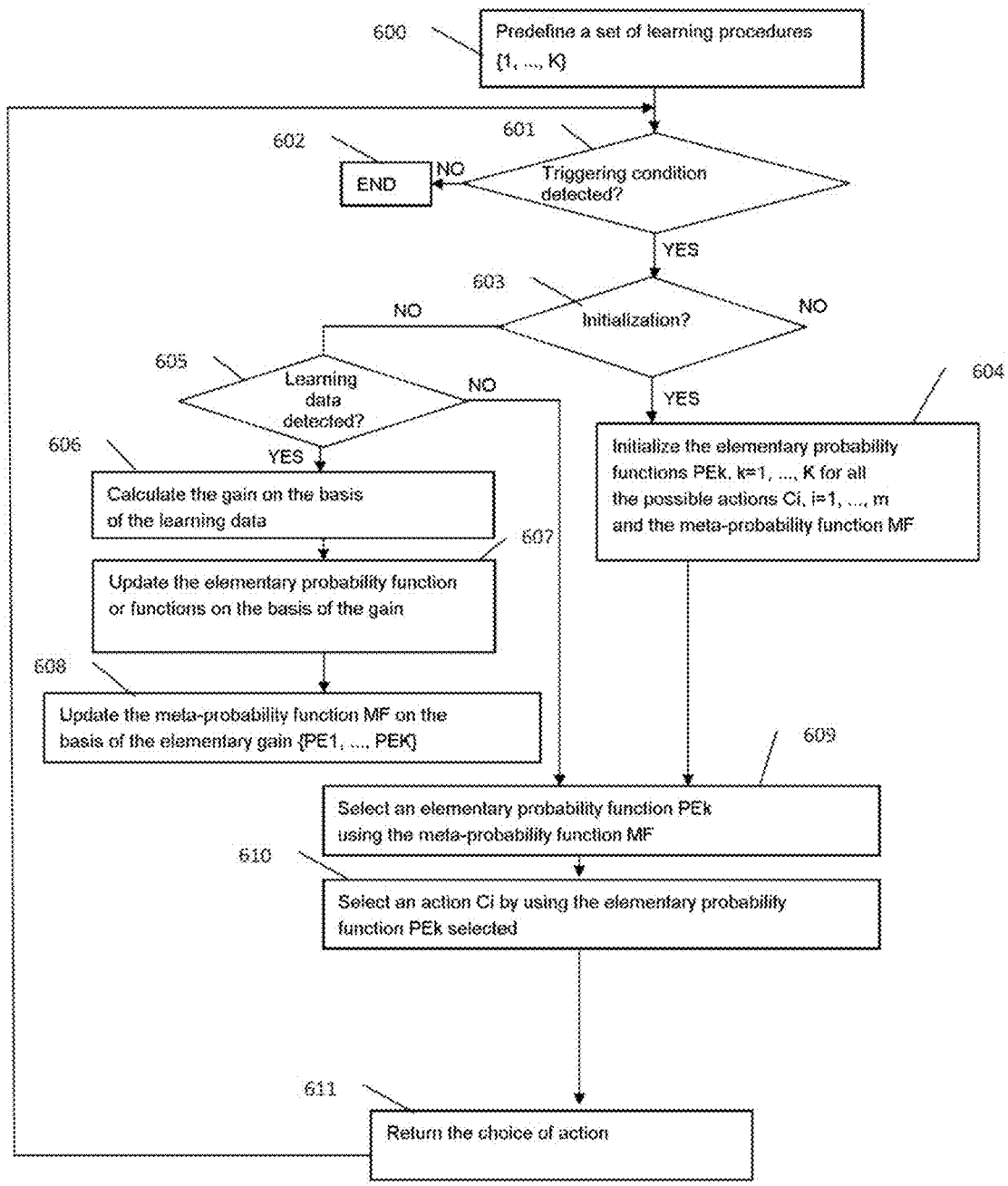
FIG. 6 is a general flowchart representing the main steps of the decision aid procedure, according to certain embodiments.

FIG. 6 is a general flowchart representing the main steps of the decision aid procedure, according to certain embodiments, that may be implemented in a competitive system comprising a set of competitive entities.

Each learning procedure Mk of the set of learning procedures 52 corresponds to a learning procedure able to "learn" which actions are liable to afford the best gain with regard to the choices of actions of the adversaries. This strategy for determining best response is known to converge to a pure Nash equilibrium if it exists. If one does not exist, the learning procedures may be more or less well suited to finding a mixed Nash equilibrium or the probability vector which maximizes the gains, the invention ultimately converging toward the most suitable. With each learning procedure is associated an elementary probability function PEk which associates a probability $p_{ik}$ with each action Ci from among m actions that may be implemented by a given competitive entity 20A of the competitive system.

The elementary probability functions PEk can be defined by a probability distribution. The probability distribution can take the form of a probability vector each component of which corresponds to one of the elementary probability functions PEk. In one embodiment, the distribution of meta-learning probabilities can be determined on the basis of learning data, and be represented by a probability vector $p(t)=(p_1(t), \ldots, p_K(t))$ such that:

each component $p_k(t)$ of the vector $p(t)$ corresponds to one of the elementary probability functions calculated by a learning procedure $k=1, \ldots, K$, t designates the decision step, and K designates the number of learning procedures.

In this embodiment, each elementary probability function PEk corresponding to a given learning procedure Mk is defined by the k-th component $p_k(t)$ of the probability vector $p(t)$ and therefore depends on t: $PEk(t)=p_k(t)$.

The elementary probability functions and the meta-probability function may in particular obey equations (also called hereinafter updating equations) applied at each step t of implementation of the method.

Each component $p_k(t)$ thus associates a probability parameter with each action Ci that may be implemented by a competitive entity (the indices $i=1, \ldots, m$ correspond to actions of the system or only the actions that can be implemented by the opposing entity 20A):

$$p_k=(p_{1k}(t), \ldots, p_{ik}(t), \ldots, p_{mk}(t)$$

The probability parameters may be for example calculated using weights. The subsequent description will be given with reference to probability parameters of weight type, by way of nonlimiting example.

A prior step 600 can be implemented to load a set of learning algorithms $\{1, \ldots, K\}$ to be used by the decision aid method. In one embodiment, one or more learning algorithms can be added or deleted hot, at any moment of the decision method.

In step 601, a triggering condition relating to a given competitive entity 20A in a competitive system is detected. For example, the triggering condition may be detected in response to the receipt of a request sent by a control device 11 controlling the competitive entity, the request comprising the identification of the competitive entity and data on the context of the entity and on the adverse entities 20B. The request may be sent by the control device 11 to obtain a recommendation of action Ci (called hereinafter "strategic choice") to be implemented by the competitive entity 20A in relation to the adverse entities 20B of the competitive system 101 such that the action Ci optimizes the gain of the opposing entity 20A in relation to these adverse entities (also called attacking entities). The recommended action Ci is associated with an expected gain which may depend on one or more adverse choices if the system comprises several opposing entities 20B.

If the triggering condition is detected in step 601, elementary probability functions $\{PE1, \ldots PEK\}$ are initialized (604) or updated (605 and 606) in correspondence with each learning algorithm k (ME1, ... MEK). Each elementary probability function PEk associates a probability parameter with each possible action of the competitive entity considered 20A, these probability parameters corresponding to a probability distribution over the set of possible actions of the competitive entity 20A. In one embodiment each probability parameter can be a weight or score. In particular, each probability function can be defined by a probability vector comprising a set of components, each component of the probability vector representing the probability parameter associated with one of the actions Ci.

The subsequent description will be given with reference to a probability parameter of weight type by way of non-limiting example.

For example, at each decision step t:

the elementary probability function PE1 associates the weights $p_1(t)=(w_{11}(t), \ldots, w_{1m}(t))$ with the possible actions $C_1, \ldots, C_m$ (strategic choices) of the entity 20A;

the elementary probability function PE2 associates the weights $p_2(t)=(w_{21}(t), \ldots, w_{2m}(t))$ with the possible actions $C_1, \ldots, C_m$ of the entity 20A;

the elementary probability function PEK associates the weights $p_K(t)=(w_{K1}(t), \ldots, w_{Km}(t))$ with the possible actions of the entity 20A;

At the first decision step of the decision aid method, each elementary probability function PEk is initialized (604). In one embodiment, the elementary probability functions may be initialized to the same value (i.e. the weights $w_{k1}(t), \ldots, w_{km}(t)$ are the same for all the functions PEk), according to a uniform probability distribution. Moreover, step 604 can comprise the initialization of the meta-probability function (also called "global probability function") which associates a weight (or more generally a probabilities parameter) with each of the elementary probability functions.

Otherwise, the elementary probability functions PEk may be updated as a function of learning data or change data on the whole set of learning algorithms (addition or deletion), in step 605 and 606.

In step 607, the global probability function ("meta-probability function") MF, denoted p(t), is updated using the gain obtained subsequent to the implementation of a chosen action. The meta-probability function associates a weight $w_k(t)$ with each of the K elementary probability functions PEk, denoted $p_k(t)$:

$$p(t)=(w_1(t), \ldots, w_k(t), \ldots, w_K(t)).$$

The weights $w_{ik}(t)$ and $w_k(t)$ are calculated at each decision step t and may for example be calculated on the basis of equations obtained by applying the gain function to the learning data which may be provided by the competitive system 101 via the control system 11. In step 609, one of the elementary probability functions PEk is selected by using the meta-probability function MF. To do this, the system undertakes a random draw of a value lying between 0 and 1 and compares this value with the probabilities of the probability function ME. For each elementary function PEj, the probabilities of the function ME are added up. If at the function PEj the sum exceeds the randomly drawn value, then the elementary probability function chosen is the function $PE_{j-1}$.

In step 610, the selected elementary probability function PEk is used to determine the strategic choice Ci (action) of the competitive entity 20A with respect to the opposing entities 20B. The selected elementary probability function PEk can choose the action Ci by using a probability distribution (for example, if the weights are probabilities, a random draw can be performed and the result of the random draw can be compared with the probability distribution). It should be noted that the weights can be reduced to probabilities by dividing each weight by the sum of the weights of the probability vector $p_k(t)$.

In step 611, a recommendation can be sent to the control device 11 (or directly to the competitive entity 20A if the control device forms an integral part of the entity), the recommendation being able to comprise an identifier of the choice of the action Ci, determined in step 610. The control device 11 can trigger the application of the action Ci to the situation (or context) of the opposing competitive entity 20A that it controls, or take another control decision as a function of a set of information on the environment and/or the context of the entity 20A.

The control device 11 can trigger the execution of the selected strategic choice Ci in the real situation (real execution) or simulated situation (simulated execution). The control device 11 can also be configured to estimate or measure the gain obtained and other auxiliary data (the gain data and the auxiliary data forming learning data) as result of the execution of the action. In particular, the "gain" obtained can represent the ratio of the observed result to the expected result, a measurement by sensor, etc. It can be calculated on the basis of a multicriteria function involving data relating to several observed metrics as well as expected values in these metrics. It can also involve procedures making it possible to take into account an uncertainty in the observation (for example the error rate).

The control device 11 can then transmit the learning data including data on the gain obtained to the decision aid system 10 (in feedback mode). It should be noted that in certain embodiments, the control device 11 can form an integral part of the decision aid system 10.

More precisely, in certain embodiments, the decision aid method can furthermore comprise a step of updating at least one elementary probability function, in step 607, in response to the receipt of learning data collected as result of the execution of the strategic choice Ci in the situation of the given competitive entity 20A (605) and after having extracted the metrics participating in the calculation of the gain function (606) from these data. The updating step 607 comprises the updating of the selected elementary probability function, and can also comprise the updating of one or more other elementary probability functions. The updating of the elementary probability functions can also be triggered in response to an addition or a deletion of learning procedures. The learning data collected by the control device 11 (605) can thus be used in the gain function which gives the gain and/or in the step of updating the elementary probability functions.

In particular, the updating step 607 can comprise the updating of the elementary probability functions PEk on the basis of the learning data (gain obtained in particular) and by using an updating function which may depend on the learning procedure associated with each elementary probability function to be updated. The updating function can be configured to update the components of the probability vector or the values of the probability parameters associated with the actions (weights for example).

In one embodiment, one and the same updating function can be defined for all the elementary probability functions of the set 52. As a variant, an updating function can be defined for a single elementary probability function or for a subgroup of elementary probability functions of the set 52. The meta-learning module 50 represented in FIG. 5 can in particular comprise a logical proxy 59 (represented schematically) able to implement the updating function defined for each elementary probability function.

In a so-called "simulation" of the situation embodiment, steps 601 to 611 can be repeated several times by using a gain matrix associated with the complete situation (or supplemented by interpolation of certain values) so as to train the meta-learning function and accelerate convergence toward optimal probabilities (the meta-learning module 50 learns on the learning procedures).

In another so-called "on-line" embodiment, a single iteration of the decision aid method of FIG. 6 can be implemented for each decision step t, by using the learning data (in particular measurements of the gain obtained which are provided by one or more sensors). Such sensors can also be used to provide information on the action actually executed. The nature and the positioning of the sensors may depend on the application context and/or on the competitive environment 101. In a military context, the sensors may for example comprise satellites. In a telecommunication context, they may for example comprise a probe configured to duplicate the packets to be examined. As a variant, the learning data (in particular on the measurements of gains and the actions performed by the entities in competition) may be absent or uncertain. In this case, the effectiveness of certain learning procedures may be limited (for example: the so-called "fictitious" player procedure is not usable if the actions of the competitive entities are not observable). It is an advantage of the invention that it is possible to adapt to this type of context, precisely by using the meta-learning method.

The method and the meta-learning module thus make it possible to determine the optimal learning procedure for a given competitive entity from among the set of K learning procedures (52) on the basis of the gain functions of the competitive entities, possibly the gain functions of the opposing entities being unknown or not (for example, when the gain matrix is not at the disposal of the decision aid system 10).

As a variant, instead of performing the updating steps (605, 606, 607 and 608), the execution of the initialization step 604 of the method of FIG. 6 (condition 603) can be triggered in response to the verification of a condition relating to the decision step t (t<T). Thus, if it is determined that t is less than the number of possible actions T (or than T added to the number K×M of learning procedures and of actions), step 604 is executed. As a variant, a condition for ignoring these same steps of the method may pertain to the evolution of the weights of the elementary probability functions PEk or of the meta-learning function MF. If these weights are stationary with regard to a threshold $\epsilon(\forall k=1, \ldots, K, |w_k(t)-w_k(t-1)|\leq\epsilon$, parameter of use of the method.

If the condition on t is satisfied, steps 609 to 611 of the decision aid method of FIG. 6 are executed to select a learning procedure to be applied, as a function of the initialization data of step 604, such as for example uniform distribution data (the elementary probability functions are then uniform).

In step 607, values of criteria or metrics relevant to the gain function are extracted from the learning data. The gain function may be for example a multicriteria mathematical function of Choquet Integral type, of Generalized Additive Utility model type or of neural network type. As a variant, the gain function can be calculated using a probabilistic model of bayesian network type if certain criteria are uncertain. For example, when the learning data are collected on the basis of diverse sensors, the sensors may be chosen to have a non-deterministic precision level (error rate, etc.) and/or not have been able to obtain the information.

In one embodiment, the probability vector p(t) as well as each elementary probability vector $p_k(t)$ (corresponding to an elementary probability function PEk corresponding to a given learning procedure Mk) can be updated respectively in steps 607 and 608 by using an updating function $p_k(t)$ dependent on elementary weights $w_k(t)$, or an updating function for the components $p_{ik}(t)$ dependent on elementary weights $w_{ik}(t)$, the elementary weights being dependent on the gains obtained (56). In particular, in step 606, the updating function for the components $p_{ik}(t)$ of each elementary probability function k associated with an action i may depend on the ratio between the elementary weight $w_{ik}(t)$ in the step t and the sum $w_k(t)$ of the elementary weights of the elementary probability function k in step t, for example according to equation (1):

$$\forall k=1,\ldots,K, i=1,\ldots,m, p_{ik}(t) = \frac{w_{ik}(t)}{w_k(t)} \text{ with} \quad [1]$$

$$w_k(t) = \Sigma_{i=1,\ldots,m} w_{ik}(t)$$

It is recalled that the indices i=1, . . . , m correspond to actions of the system or to the actions that can be implemented by the opposing entity.

To facilitate the understanding of certain embodiments of the method of FIG. 6, the following definitions are provided:

the variable $p_k$ representing the probability that the meta-function proposes elementary function k in step 609;

the variable $p_{ik}$ representing the probability that the elementary function k proposes action i in step 610;

the variable $w_{ik}$ representing the weight of the elementary function k corresponding to action i;

the variable $w_k$ representing the total weight associated with each elementary probability function k (sum of the $w_{ik}$); and the variable w representing the sum of the variables $w_k$.

It should be noted that steps 601 to 611 can be repeated T times. At each execution or decision step t=1, . . . , T of the method of the invention, the variables hereinabove are then denoted by associating the expression "(t)".

In one embodiment, the updating function for the components of the global probability function, in step 608, may depend on the ratio the elementary weights $w_k(t)$ and the elementary weights w(t), for example according to equation (2):

$$\forall k=1,\ldots,K, p_k(t) = \frac{w_k(t)}{w(t)} \quad [2]$$

As a variant, each probability vector $p_{ik}(t)$ may be updated in step 607 in such a way as to guarantee a certain exploration (trial of new actions or replay of certain actions) as follows:

$$\forall k=1,\ldots,K, i=1,\ldots,m, p_{ik}(t) = (1-\gamma_t)\frac{w_{ik}(t)}{w_k(t)} + \frac{\gamma_t}{m}. \quad [3]$$

Likewise, each probability vector p(t) or $p_k(t)$ may be updated in step 608 in such a way as to guarantee a certain exploration (trial of new actions or replay of certain actions) as follows:

$$\forall k=1,\ldots,K, p_k(t) = (1-\gamma_t)\frac{w_k(t)}{w(t)} + \frac{\gamma_t}{K}, \quad [4]$$

the parameter $0<\gamma_t \leq 1$ possibly decreasing over time so as to stabilize the exploration or being constant.

In another embodiment, the probability distribution can be updated in steps 607 and/or 608, directly on the basis of gain parameters measuring the regret of having chosen a learning procedure at a given decision step.

Denoting $$R_t(j,k) = \frac{1}{t}\sum_{\tau \leq t}\left[\frac{p_j(\tau)}{p_k(\tau)}u_\tau - u_\tau\right]_+,$$

with $\tau \leq t$, the regret parameter representing the regret of choosing learning procedure j instead of k, with $u_\tau$ designating the gain received, each component $w_{jk}$ of the probability vector $p_k(t)$ can then be updated in step 607 according to the following updating function, where Ct designates the action chosen by the system at decision step t:

$$w_{jk}(t+1) = \begin{cases} (1-\gamma)\min\left(\frac{1}{\mu}R_t(j,i), \frac{1}{K-1}\right) + \frac{\gamma}{K} & \text{if } Cj \text{ not chosen at step } t \\ 1 - \frac{1}{\gamma_t}\sum_{j \neq k} w_{jk}(t+1) & \text{if } Cj \text{ chosen at step } t \end{cases} \quad [5]$$

Similarly, each component $w_k$ of the global vector $p(t)$ can be updated in step 608 according to the following updating function, where Ct designates the action chosen by the system at decision step t:

$$w_k(t+1) = \begin{cases} (1-\gamma)\min\left(\frac{1}{\mu}R_t(k,j), \frac{1}{K-1}\right) + \frac{\gamma}{K} & \text{if } PEk \text{ not chosen at step } t \\ 1 - \frac{1}{\gamma_t}\sum_{j \neq k} w_k(t+1) & \text{if } PEk \text{ chosen at step } t \end{cases} \quad [6]$$

In yet another embodiment, each component $w_{ik}$ of the elementary vector $p_k(t)$ can be updated, in step 607, directly on the basis of the gain obtained according to equation [3] with $b \leq 0.5$ and b possibly decreasing over time according to the following updating function:

$$w_{ik}(t+1) = \begin{cases} w_{ik}(t) + b(1 - w_{ik}(t))u(i,t) & \text{if } Ci \neq Ct \text{ not chosen at step } t \\ p_{ik}(t) - bw_{ik}(t)u(i,t) & \text{if } Ci = Ct \text{ chosen at step } t \end{cases} \quad [7]$$

Similarly, each component $w_k$ of the global vector $p(t)$ can be updated, in step 608, directly on the basis of the gain obtained according to equation [3] with $b \leq 0.5$ and b possibly decreasing over time according to the following updating function:

$$w_k(t+1) = \begin{cases} w_k(t) + b(1 - w_k(t))u(k,t) & \text{if } PEk \text{ not chosen at step } t \\ w_k(t) - bw_k(t)u(k,t) & \text{if } PEk \text{ chosen at step } t \end{cases} \quad [8]$$

In equation [8], u(k, t) designates the gain obtained by having chosen the elementary probability function PEk. It is therefore equal to that obtained by having chosen action i so that: $u(k, t)=u(i, t)$ if PEk was chosen at step t.

Additionally, step 607 of updating the elementary probability functions (respectively the meta-function in step 608) according to equations [1] (respectively [2]) and [3] (respectively [4]) can comprise the updating of the elementary weights $w_{ik}(t+1)$ (respectively $w_k(t+1)$) by using the gains obtained or the formula of equation [9] (respectively [10] for the updating of the global probability vector in step 608):

$$\forall k=1, \ldots, K, i=1, \ldots, m, w_{ik}(t+1)=w_{ik}(t)(1-\eta(t))^{l_i(t)} \quad [9]$$

$$\forall k=1, \ldots, K, w_k(t+1)=w_k(t)(1-\eta(t))^{l_k(t)} \quad [10]$$

In equation [9], the parameters $$\eta \in \left[0, \frac{1}{2}\right]$$

and $l_i(t)$ designate the loss incurred by choosing action Ci at decision step t. In equation [10], the parameter $l_k(t)$ designates the loss incurred by using learning procedure k at decision step t.

In another variant, the weights of the elementary probability vectors in step 607 of updating the elementary probability functions (respectively in step 608 of updating the meta-function) by using equations [1] (respectively [2]) and [3] (respectively [4]) can also be updated by applying a Boltzmann (or Gibbs) distribution function to the gains obtained according to the equations:

$$\forall k=1, \ldots, K, w_{ik}(t+1) = w_{ik}(t)e^{\left(\frac{\gamma}{m}*\frac{u(i,t)}{w_k(t)}\right)} \quad [11]$$

for the updating of step 607;

$$\forall k=1, \ldots, K, w_{ik}(t+1) = w_{ik}(t)e^{\left(\frac{\gamma}{m}*\frac{u(i,t)}{w_k(t)}\right)} \quad [12]$$

for the updating of step 608;

It should be noted that equations [7] and [8] are particularly suitable when the distribution of gain over time is not known. In particular, if a significant variation of the gain is observed for the same given actions chosen by one or more learning procedures.

In another embodiment, the weights can take into account the state of the environment s E S defined by the decision aid system 10. In this embodiment, the weights of the elementary probability functions (607) (respectively of the meta-function (608)) such as defined by equations [1] (respectively [2]) and [3] (respectively [4]) can also be updated as a function of:

The following equation [13] for the updating of step 607:

$$w_{s,ik}(t+1)=(1-\alpha)w_{s,ik}(t)+\alpha[u_t(\alpha_k)+\gamma\max_{s',i'k}w_{s',i'k}(t+1)] \quad [13]$$

The following equation [14] for the updating of step 608:

$$w_{s,k}(t+1)=(1-\alpha)w_{s,k}(t)+\alpha[u_t(\alpha_k)+\gamma\max_{s',k}w_{s',k}(t+1)] \quad [14]$$

In equations [13] and [14], the parameter a designates the exploration rate which can also decrease over time, and γ an update rate (it makes it possible to weight the importance of the future gains).

In one embodiment, the learning data collected by the decision aid system 10 can be mean gains data. The elementary probability functions PEk can then be defined by using a score as probability parameter associated with each action Ci.

For example, for each elementary probability function PEk corresponding to a given learning procedure, the score associated with an action Ci can be determined as a function of the average of the gains obtained for this action in response to the execution of the learning procedure PEk at least once.

To increase the exploration, a random can be used in order to choose a uniform probability distribution over the actions.

As a variant, the score associated with each action Ci can be determined on the basis of the average of the gains received by using learning procedure k corresponding to the elementary probability function PEk and by taking into account an exploration factor. For example, the score can be calculated according to the following equation:

$$\text{score}_i(t) = \tilde{u}_t + \sqrt{\frac{2\ln t}{N_i}}$$

where $N_i$ designates the number of times that the action Ci has been chosen and $\tilde{u}_t$ is the average of the gains obtained by choosing the action Ci.

The meta-learning function can be used to perform a draw, thereby making it possible to select an elementary probability function.

In another embodiment, the decision aid system 10 is configured to collect information on the actions of the adverse entities 20B and to receive an information item relating to the number of times that each action Ci has been chosen for each action Ci. The learning data can then comprise data on the actions of the adverse entities 20B. In such an embodiment, the decision aid system 10 can determine probability distributions relating to the actions chosen by the adverse entities and making it possible to determine the probable actions of the adverse entities. Each elementary probability function PEk can then associate a probability parameter not only with the possible actions of the opposing entity 10A but also with the possible actions of the adverse entities 20B. The action chosen in step 610 consequently corresponds to the action which maximizes the gain of the competitive entity 20A while coping with the strategy of the adverse entities.

Figure 7:
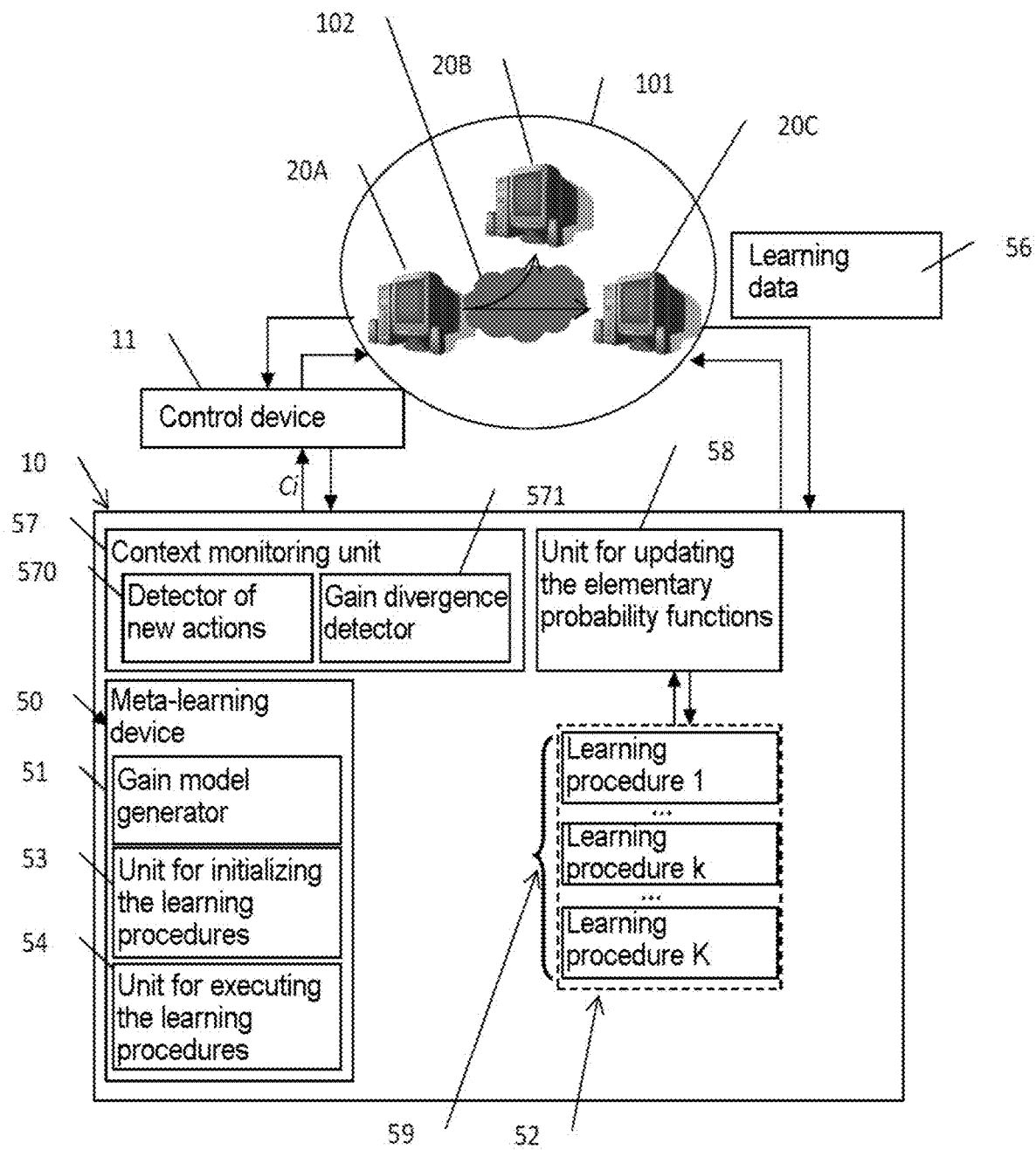
FIG. 7 shows an exemplary environment in which the decision aid system can be implemented according to one embodiment.

FIG. 7 shows an exemplary environment in which the decision aid system 10 can be implemented according to one embodiment. The competitive system 101 comprises competitive entities of computer type connected via a network 102. The entity 20A (opposing entity) seeks to send a message (for example http message) to a recipient computer 20C via an Internet network 102. The competitive entity 20B tries to block the dispatch of the message. The decision aid system 10 is similar to that of FIG. 1. However, in the embodiment of FIG. 7, the decision aid system 10 furthermore comprises a context monitoring unit 57 configured to monitor the changes of context. The monitoring unit 57 can comprise a detector of actions 570 to detect the new actions of a competitive entity and a gain divergence detector 571 to detect a divergence of gain of a competitive entity with respect to a target gain (for example gain average). The decision aid system 10 can also comprise a unit for updating the learning procedures 58 which is configured to update one or more learning procedures from among the K learning procedures as a function of a change detected by the context monitoring unit 57, such as for example the appearance of new actions which are detected by the action detector 570 or the detection of a strong divergence of gains which is detected by the gain detector 571. The gain detector 571 can apply a set of statistical tests relating to the gains such as for example a limit test on the variance of gain or a test such as the ARIMA (acronym for "Autoregressive Integrated Moving Average") or the Page-Kinkley test. In response to such tests, the unit for updating the learning procedures can trigger a reinitialization of the learning data. This reinitialization can be implemented in the form of a restart, for example by setting to 1 the elementary weights associated with the elementary functions PEk or by modifying the weights according to a uniform probability distribution. As a variant, the reinitialization can be implemented by modifying the elementary probability functions PEk corresponding to the learning functions Mk in such a way that they associate a probability parameter (e.g. weight) with each new action detected, by initializing the probability parameter to an initial value. The initial values can be determined by drawing as a function of the meta-probability function.

The invention thus makes it possible to select a learning algorithm by means of the meta-learning device 10, whatever the number and the nature of the learning algorithms 52.

The inventor has compared the performance of the decision aid system and method of the invention with Brown's conventional game algorithm, as illustrated by the gain matrix of FIG. 8. The gain matrix corresponds to the same exemplary embodiment as FIG. 3 with c=0.3.

A first set of experiments were conducted 50 times for 100 decision steps in a competitive system comprising two entities 1 and 2 using Brown's algorithm. The two competitive entities were first observed assuming that each entity can have information on the choices of the other competitive entity and that the gain matrix of the other competitive entity is known.

FIG. 9 represents an exemplary evolution of the gains of the entities 1 and 2 obtained over time (average over 50 executions) when the two competitive entities 1 and 2 use Brown's algorithm: over the long-term, entity 2 obtains greater gains than those of entity 1.

FIG. 10 represents an exemplary evolution of the probability value associated with the choice of each action A or B for each entity 1 or 2 during the experiment:

a first curve C1 represents the evolution of the probability value associated with the choice of each action A by entity 1 during the experiment;

a second curve C2 represents the evolution of the probability value associated with the choice of each action B by entity 1 during the experiment;

a third curve C3 represents the evolution of the probability value associated with the choice of each action A by entity 2 during the experiment; and a fourth curve C4 represents the evolution of the probability value associated with the choice of each action B by entity 2 during the experiment.

FIG. 10 shows that each entity follows a mixed strategy associating the probability values {½; ½} with the actions {A, B}.

FIGS. 9 and 10 thus illustrate that Brown's algorithm converges to the mixed Nash Equilibrium.

The decision aid method has been implemented for the exemplary competitive context illustrated by the tables of FIG. 2 by varying the learning procedure for each competitive entity. It has been observed that the most efficacious learning procedure for this example is the learning procedure corresponding to equation [5]. To evaluate the effectiveness of the decision method of the invention, based on the step of determining the meta-learning function, the invention has been compared with Brown's algorithm and a conventional learning algorithm according to equation [5]. It should also be noted that other experiments have shown that the learning algorithm according to equation [5] is more efficacious versus Brown's algorithm. It is recalled that like Brown's algorithm, formula [5] assumes that the environment has an impact on the competitive context. The environment can be modeled in various ways for example by using the strategy of the adverse entity.

FIG. 1 represents in a schematic manner an exemplary architecture implementing a decision aid system 10 according to certain embodiments.

A learning procedure can be implemented conventionally according to the steps of the flowchart of FIG. 2, using a single learning method throughout the whole decision cycle.

The embodiments of the invention may for example be implemented in a competitive system of telecommunication system type including a set of senders 20A and a set of receivers 20B/20C as is represented in FIG. 3.

FIG. 4 represents a gain matrix (also called table of gains) corresponding to an exemplary competitive system where a competitive entity 20A is threatened by electronic attacks implemented by one or more attacking entities 20B.

FIG. 5 is a schematic view of the decision aid system 10 comprising a meta-learning module according to certain embodiments.

FIG. 6 is a general flowchart representing the main steps of the decision aid procedure, according to certain embodiments, that may be implemented in a competitive system comprising a set of competitive entities.

FIG. 7 shows an exemplary environment in which the decision aid system 10 can be implemented according to one embodiment. The competitive system 101 comprises competitive entities of computer type connected via a network 102.

The inventor has compared the performance of the decision aid system and method of the invention with Brown's conventional game algorithm, as illustrated by the gain matrix of FIG. 8. The gain matrix corresponds to the same exemplary embodiment as FIG. 3.

FIG. 9 represents an exemplary evolution of the gains of the entities 1 and 2 obtained over time (average over 50 executions) when the two competitive entities 1 and 2 use Brown's algorithm: over the long-term, entity 2 obtains greater gains than those of entity 1.

FIG. 10 represents an exemplary evolution of the probability value associated with the choice of each action A or B for each entity 1 or 2 during the experiment.

Figures 11, 12, 13:
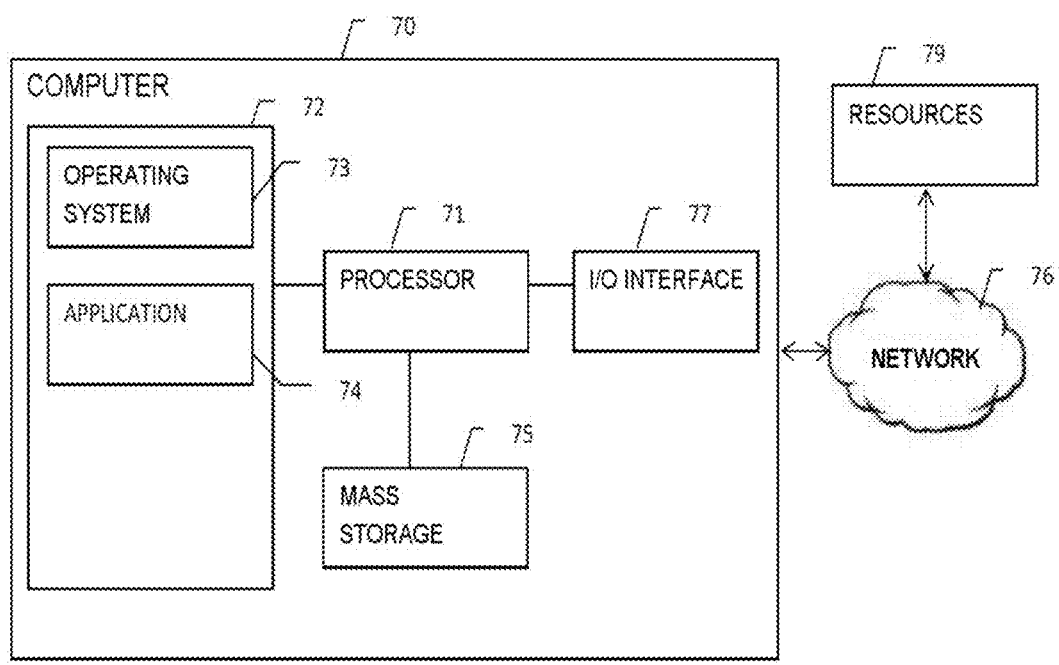
FIG. 11 is an exemplary table of gains illustrating the mean gain that each competitive entity has obtained after 100 games, according to an exemplary embodiment.
FIG. 12 illustrates the results obtained with a type of particular learning procedure.
FIG. 13 is a schematic view of an IT system that may be used to implement the decision aid system according to certain embodiments.

The table of FIG. 11 shows the mean gain that each competitive entity has obtained after 100 games (the results for entity 1 are indicated in the left-hand columns 900 and those obtained for entity 2 are indicated in the right-hand columns 902). In this example, it can be observed that the best strategy for competitive entity 1 is to choose a learning procedure based on formula EQ.5 while that of competitive entity 2 is to use the decision aid method according to the invention which uses a meta-learning function.

The table 12 shows the results obtained with a more "blind" learning procedure, based on equation 4. In this case, equilibrium is attained when the two entities use the decision aid method according to the invention (in this example, equilibrium is the social optimum).

The person skilled in the art will understand that the decision aid method according to the embodiments can be implemented in diverse ways by hardware, software, or a combination of hardware and of software, in particular in the form of program code that can be distributed in the form of a program product, in diverse forms. In particular, the program code can be distributed with the aid of computer readable media, which can include computer readable storage media and communication media. The methods described in the present description can in particular be implemented in the form of computer program instructions executable by one or more processors in an IT computer device. These computer program instructions can also be stored in a computer readable medium.

In particular, as illustrated in FIG. 13, the decision aid system 10 and/or the control device 11 and/or each competitive entity 20A or 20B can be implemented in the form of one or more IT devices or systems 70 (called computer hereinafter). The computer 70 can comprise a processor 71, a memory 72, a mass storage memory device 75, an input/output interface (I/O) 77 (for example, video screen, touchscreen, entry devices and controls such as an alphanumeric keyboard, a pointing device, numerical pads, push-buttons, control buttons, microphones, etc.). The computer 70 can also be coupled in a functional manner to one or more external resources via a network 76 and/or an I/O interface 77. External resources 79 can include, but without being limited thereto, servers, databases, mass storage devices, peripheral devices, cloud-based network services, or any other appropriate IT resource which can be used by the computer 70.

The processor 71 can include one or more processor devices such as microprocessors, microcontrollers, central processing units, or any other device which manipulates (analog or digital) signals as a function of instructions of operations which are stored in the memory 72. The processor 71 can operate under the control of an operating system 73 which resides in the memory 72. The operating system 73 can manage IT resources such as an IT program code integrated in the form of one or more software applications 74 residing in the memory 72.

The invention is not limited to the embodiments described hereinabove by way of nonlimiting example. It encompasses all the variant embodiments that might be envisaged by the person skilled in the art. In particular, the invention is not limited to a particular competitive system and includes any competitive system including at least two adverse competitive entities. Moreover, the set 52 of learning procedures (or algorithms) can include any type of learning procedure without limitation. Nor is this set limited by a particular number of learning procedures. Nor is the invention limited to particular updating functions for the learning procedures. These updating functions can differ for each learning procedure. They can also change for a given learning procedure between each iteration of the decision aid method.

The invention claimed is:

1. A decision aid method for determining an action to be implemented by a given competitive entity in a competitive system comprising said competitive entity and at least one other adverse competitive entity, the competitive entity being able to implement an action from among a set of predefined actions, each action providing a different expected gain as a function of the actions implemented by said adverse competitive entities, each entity furthermore being able to implement a learning method from among a set of predefined learning method to learn the actions of the adverse entities, associating with each learning method an elementary probability function which assigns a probability parameter to each possible action of the given competitive entity;

determining a global probability function which assigns a probability parameter to each elementary probability function;

selecting one of the elementary probability functions by using the global probability function; and applying the selected elementary probability function to determine an action from among said actions implementable by said given competitive entity, wherein the method comprises a step of updating at least one elementary probability function by using an updating function, in response to the receipt of learning data obtained by executing or by simulating the selected elementary probability function and the action actually chosen in the competitive system at least once, wherein the updating functions comprise at least one updating function dependent on elementary weights, each elementary weight being associated with a given action and the elementary weights being dependent on the gains obtained, the updating step furthermore comprising the updating of said elementary weights as a function of the loss incurred by using the learning method associated with the elementary probability function to be updated, at a given decision step.

2. The method as claimed in claim 1, comprising a prior step of modeling the strategic situation of the given competitive entity in the form of a game model comprising the set of possible actions of the competitive entities and the gain function applying to said actions, the gain function associating an expected gain with each action or combination of actions of the competitive entities.

3. The method as claimed claim 1, wherein said probability parameter is a weight value.

4. The method as claimed in claim 1, wherein the elementary probability functions correspond to a component of a probability vector defined as a function of a probability distribution.

5. The method as claimed in claim 4, wherein each component of the probability vector depends on predefined elementary weights.

6. The method as claimed in claim 1, comprising a step of calculating the gain function on the basis of learning data.

7. The method as claimed in claim 6, wherein the gain function depends on one at least of the following multicriteria models from among a weighted sum, Choquet Integral, a generalized additive utility model, a neural network.

8. The method as claimed in claim 6, wherein the gain function depends on a probabilistic model.

9. The method as claimed in claim 1, wherein the updating step comprises the updating of said selected elementary probability function.

10. The method as claimed in claim 9, wherein the updating step further comprises the updating of at least one of said other elementary probability functions.

11. The method as claimed in claim 10, wherein the updating step comprises the application of a different updating function for each elementary probability function.

12. The method as claimed in claim 1, wherein the updating functions comprise at least one updating function dependent on the gain obtained.

13. The method as claimed in claim 1, wherein said updating function for a given elementary probability function comprises an action-wise component, each action-wise component depending on the ratio between the elementary weight associated with said action, at the decision step considered, and the total sum of the elementary weights corresponding to the various components of the elementary probability function at said decision step.

14. The method as claimed in claim 1, wherein the updating step comprises the updating of said elementary weights by applying a Boltzmann distribution function to the gains obtained.

15. The method as claimed in claim 1, wherein the updating step comprises the updating of said elementary weights as a function of a parameter representing the state of the environment, of an exploration rate, and of a reset factor.

16. The method as claimed in claim 1, wherein the updating functions comprise at least one updating function dependent on gain parameters received measuring the regret of having chosen the learning method associated with the elementary probability function rather than another learning method, at a given decision step.

17. A computer program product, said computer program comprising code instructions making it possible to perform the steps of the method as claimed in claim 1, when said program is executed on a computer.

18. A decision aid system for determining an action to be implemented by a given competitive entity in a competitive system comprising said competitive entity and at least one other adverse competitive entity, the competitive entity being able to implement an action from among a set of predefined actions, each action providing a different expected gain as a function of the actions implemented by said adverse competitive entities, each entity furthermore being able to implement a learning method from among a set of predefined learning method to learn the actions of the adverse entities, each learning method being associated with an elementary probability function associating a probability parameter with each possible action of the given competitive entity, the system comprising a global learning module configured to determine a global probability function able to associate a probability parameter with each elementary probability function, the global learning module furthermore comprising a selection unit able to select one of said elementary probability functions by using the global probability function, the global learning module being able to apply the selected elementary probability function to determine an action from among said actions implementable by said given competitive entity, wherein the system is configured to update at least one elementary probability function by using an updating function, in response to the receipt of learning data obtained by executing or by simulating the selected elementary probability function and the action actually chosen in the competitive system at least once, wherein the updating functions comprise at least one updating function dependent on elementary weights, each elementary weight being associated with a given action and the elementary weights being dependent on the gains obtained, the system being configured to update at least one elementary probability function by updating of said elementary weights as a function of the loss incurred by using the learning method associated with the elementary probability function to be updated, at a given decision step.

19. A decision aid method for determining an action to be implemented by a given competitive entity in a competitive system comprising said competitive entity and at least one other adverse competitive entity, the competitive entity being able to implement an action from among a set of predefined actions, each action providing a different expected gain as a function of the actions implemented by said adverse competitive entities, each entity furthermore being able to implement a learning method from among a set of predefined learning procedures to learn the actions of the adverse entities, associating with each learning method an elementary probability function which assigns a probability parameter to each possible action of the given competitive entity;

determining a global probability function which assigns a probability parameter to each elementary probability function;

selecting one of the elementary probability functions by using the global probability function; and applying the selected elementary probability function to determine an action from among said actions implementable by said given competitive entity, wherein the method comprises a step of updating at least one elementary probability function by using an updating function, in response to the receipt of learning data obtained by executing or by simulating the selected elementary probability function and the action actually chosen in the competitive system at least once, wherein the updating functions comprise at least one updating function dependent on elementary weights, each elementary weight being associated with a given action and the elementary weights being dependent on the gains obtained, wherein said updating function for a given elementary probability function comprises an action-wise component, each action-wise component depending on the ratio between the elementary weight associated with said action, at the decision step considered, and the total sum of the elementary weights corresponding to the various components of the elementary probability function at said decision step.

20. A decision aid method for determining an action to be implemented by a given competitive entity in a competitive system comprising said competitive entity and at least one other adverse competitive entity, the competitive entity being able to implement an action from among a set of predefined actions, each action providing a different expected gain as a function of the actions implemented by said adverse competitive entities, each entity furthermore being able to implement a learning method from among a set of predefined learning methods to learn the actions of the adverse entities, associating with each learning method an elementary probability function which assigns a probability parameter to each possible action of the given competitive entity;

determining a global probability function which assigns a probability parameter to each elementary probability function;

selecting one of the elementary probability functions by using the global probability function; and applying the selected elementary probability function to determine an action from among said actions implementable by said given competitive entity, wherein the method comprises a step of updating at least one elementary probability function by using an updating function, in response to the receipt of learning data obtained by executing or by simulating the selected elementary probability function and the action actually chosen in the competitive system at least once, wherein the updating functions comprise at least one updating function dependent on gain parameters received measuring the regret of having chosen the learning method associated with the elementary probability function rather than another learning method, at a given decision step.

21. A decision aid system for determining an action to be implemented by a given competitive entity in a competitive system comprising said competitive entity and at least one other adverse competitive entity, the competitive entity being able to implement an action from among a set of predefined actions, each action providing a different expected gain as a function of the actions implemented by said adverse competitive entities, each entity furthermore being able to implement a learning method from among a set of predefined learning methods to learn the actions of the adverse entities, each learning method being associated with an elementary probability function associating a probability parameter with each possible action of the given competitive entity, the system comprising a global learning module configured to determine a global probability function able to associate a probability parameter with each elementary probability function, the global learning module furthermore comprising a selection unit able to select one of said elementary probability functions by using the global probability function, the global learning module being able to apply the selected elementary probability function to determine an action from among said actions implementable by said given competitive entity, wherein the system is configured to update at least one elementary probability function by using an updating function, in response to the receipt of learning data obtained by executing or by simulating the selected elementary probability function and the action actually chosen in the competitive system at least once, wherein the updating functions comprise at least one updating function dependent on elementary weights, each elementary weight being associated with a given action and the elementary weights being dependent on the gains obtained, wherein said updating function for a given elementary probability function comprises an action-wise component, each action-wise component depending on the ratio between the elementary weight associated with said action, at the decision step considered, and the total sum of the elementary weights corresponding to the various components of the elementary probability function at said decision step.

22. A decision aid system for determining an action to be implemented by a given competitive entity in a competitive system comprising said competitive entity and at least one other adverse competitive entity, the competitive entity being able to implement an action from among a set of predefined actions, each action providing a different expected gain as a function of the actions implemented by said adverse competitive entities, each entity furthermore being able to implement a learning method from among a set of predefined learning methods to learn the actions of the adverse entities, each learning method being associated with an elementary probability function associating a probability parameter with each possible action of the given competitive entity, the system comprising a global learning module configured to determine a global probability function able to associate a probability parameter with each elementary probability function, the global learning module furthermore comprising a selection unit able to select one of said elementary probability functions by using the global probability function, the global learning module being able to apply the selected elementary probability function to determine an action from among said actions implementable by said given competitive entity, wherein the system is configured to update at least one elementary probability function by using an updating function, in response to the receipt of learning data obtained by executing or by simulating the selected elementary probability function and the action actually chosen in the competitive system at least once, wherein the updating functions comprise at least one updating function dependent on gain parameters received measuring the regret of having chosen the learning method associated with the elementary probability function rather than another learning method, at a given decision step.

\* \* \* \* \*